United States Patent
Mendel et al.

(10) Patent No.: US 11,092,225 B2
(45) Date of Patent: Aug. 17, 2021

(54) STRAIN WAVE GEAR MECHANISM WITH AN INNER SEAL

(71) Applicant: Harmonic Drive AG, Limburg/Lahn (DE)

(72) Inventors: Matthias Mendel, Limburg (DE); Michael Schaffer, Niederbrechen (DE); Dominik Göbel, Kaden (DE); Alexander Arthen, Brechen (DE); Johannes Petrus Koenen, Limburg (DE)

(73) Assignee: Harmonic Drive AG, Limburg/Lahn (DE)

( * ) Notice: Subject to any disclaimer, the term of this patent is extended or adjusted under 35 U.S.C. 154(b) by 144 days.

(21) Appl. No.: 16/484,492

(22) PCT Filed: Feb. 28, 2017

(86) PCT No.: PCT/EP2017/054549
§ 371 (c)(1),
(2) Date: Aug. 8, 2019

(87) PCT Pub. No.: WO2018/157910
PCT Pub. Date: Sep. 7, 2018

(65) Prior Publication Data
US 2020/0003288 A1 Jan. 2, 2020

(51) Int. Cl.
*F16H 49/00* (2006.01)
*F16H 57/025* (2012.01)
(Continued)

(52) U.S. Cl.
CPC ......... *F16H 49/001* (2013.01); *F16H 57/025* (2013.01); *B25J 9/1025* (2013.01);
(Continued)

(58) Field of Classification Search
CPC .......... F16H 57/0454; F16H 2049/003; F16H 49/001; F16C 33/78
See application file for complete search history.

(56) References Cited

U.S. PATENT DOCUMENTS 5,984,048 A 11/1999 Kiyosawa
7,410,439 B2 8/2008 Minegishi
(Continued)

FOREIGN PATENT DOCUMENTS

CN 105864365 A 8/2016
CN 205677987 U 11/2016
(Continued)

OTHER PUBLICATIONS

English translation of Official Action of Japanese Patent Office for application JP 2019-546399, dated Oct. 20, 2020.
(Continued)

*Primary Examiner* — Randell J Krug
(74) *Attorney, Agent, or Firm* — Rogowski Law LLC (57) ABSTRACT

A strain wave gear mechanism (1) has a gear mechanism component (CS) and an elastically deformable transmission component (FS) that is at least partially in alignment therewith in the radial direction (29) and can be deformed elliptically by way of a drive component (WG). Internal or external toothing systems (8, 9) on the gear mechanism component (CS) and the transmission component (FS) are brought into engagement in opposite regions of an elliptical axis to rotate the transmission component (FS) and the gear mechanism component (CS) relative to one another. The transmission component (FS) and the gear mechanism component (CS) are mounted such that they can be rotated relative to one another by means of a pivot bearing (30) which has a bearing intermediate space (16). To maintain lubrication and avoid lubricant leaks, an interior space (28) of the strain wave gear mechanism (1) that adjoins the pivot
(Continued)

bearing (30) is sealed by an inner seal (12) with respect to the bearing intermediate space (16) of the pivot bearing.

16 Claims, 9 Drawing Sheets

(51) Int. Cl.
  *B25J 9/10* (2006.01)
  *F16H 57/029* (2012.01)
  *F16H 57/04* (2010.01)

(52) U.S. Cl.
  CPC ........ *F16H 57/029* (2013.01); *F16H 57/0454* (2013.01); *F16H 2049/003* (2013.01)

(56) References Cited

U.S. PATENT DOCUMENTS

| | | | |
|---|---|---|---|
| 9,316,259 B2 | | 4/2016 | Itou |
| 10,077,829 B2 * | | 9/2018 | Kliber ................ F16H 57/0421 |
| 2002/0135241 A1 | | 9/2002 | Kobayashi |
| 2004/0026207 A1 * | | 2/2004 | Dittmer .................. F16D 23/14 |
| | | | 192/98 |
| 2015/0285357 A1 * | | 10/2015 | Orii ....................... F16H 49/001 |
| | | | 74/640 |
| 2015/0300475 A1 * | | 10/2015 | Murayama .......... F16H 57/0454 |
| | | | 74/640 |
| 2017/0051817 A1 | | 2/2017 | Maruyama |
| 2018/0016972 A1 * | | 1/2018 | Nagai ................... F16H 49/001 |

FOREIGN PATENT DOCUMENTS

| | | | | |
|---|---|---|---|---|
| DE | 19741227 A1 | | 3/1999 | |
| DE | 102013222454 A1 * | | 5/2015 | ........... F16H 49/001 |
| DE | 102013222454 A1 | | 5/2015 | |
| DE | 112014001512 T5 | | 1/2016 | |
| JP | 07-119800 A | | 5/1995 | |
| JP | H077119800 A1 | | 5/1995 | |
| JP | 2011174570 A | | 9/2011 | |
| JP | 2015072067 A | | 4/2015 | |
| TW | I269847 | | 8/1994 | |
| TW | I269847 B | | 1/2007 | |

OTHER PUBLICATIONS

Official Action of Chinese Intellectual Property Office for application CN 107106627, dated Oct. 16, 2019.

* cited by examiner

STRAIN WAVE GEAR MECHANISM WITH AN INNER SEAL

CROSS-REFERENCE TO RELATED APPLICATIONS

This application is a national stage application (under 35 USC § 371) of PCT/EP2017/054549, filed Feb. 28, 2017, the contents of which are incorporated by reference herein.

BACKGROUND OF THE INVENTION

Technical Field and State of the Art

The present invention relates to a strain wave gear mechanism.

Such gear mechanisms are used in a variety of ways in many fields of technology, and they are being increasingly used, in particular, in robotic technology and also in prosthetics. We refer, for example, to the Harmonic Drive® gear mechanism of the applicant which belongs to the group of the strain wave gear mechanism and whose functionality is described, for example, at http://harmonicdrive.de/technologie/harmonic-drive-wellgetriebe/; Harmonic Drive® is a registered trademark of Harmonic Drive AG, Limburg an der Lahn, Germany.

In the customary construction of the strain wave gear mechanism, the drive component described there as an elliptical "wave generator" deforms with a roller bearing the gear mechanism component described as an externally toothed flex spline which is engaged with the internally toothed gear mechanism component described as a circular spline in the opposite regions of the large elliptical axis. With the pivoting of the wave generator, the large elliptical axis and thus the tooth engagement region shifts. Because the flex spline of the strain wave gear mechanism has two fewer teeth than the circular spline, a relative movement occurs between the flex spline and the circular spline by one tooth during a half revolution of the wave generator and by two teeth during a full revolution whereby a high transmission ratio is realized. With a fixed circular spline, the flex spline pivots as an output element opposite to the drive. The circular spline can be arranged on a bearing ring in a fixable fashion.

With the flat construction, the flex spline is formed as a thin-walled, elastically deformable ring which assumes an elliptical form due to the wave generator. The external toothing system of the flex spline is engaged with the internal toothing system of the circular spline as well as with an internal toothing system of an additionally provided dynamic spline. The dynamic spline is an internally toothed ring gear with the same number of teeth as the flex spline. It rotates in the same rotational direction and at the same rotational speed as the flex spline and is used as an output element in the reduction operation.

In addition to the customary construction, the strain wave gear mechanism can also be formed in a so-called flat construction or in an inverse construction as a so-called external rotor.

Here, the flex spline is formed as a flexible, internally toothed component which is surrounded by elliptically formed wave generators as well as a roller bearing in the toothing region. The internal toothing system of the flex spline engages with the external toothing system of the circular spline formed as a gearwheel. By contrast to the customary strain wave gear mechanism, the opposite tooth contact appears between the internally toothed flex spline and the wave generator on the flattened side of its elliptical form, i.e. in the region of the small semi-axis.

Within the scope of the present application, the terms "gear mechanism component", "circular spline", and the acronym "CS" are used synonymously. Further, the terms "drive component", "wave generator", and the acronym "WG" are used synonymously. Further, the terms "transmission component", "flex spline", and the acronym "FS" are used synonymously.

A particular advantage of the strain wave gear mechanisms is that they have practically no clearance increase in the toothing system over their entire lifetime and have an excellent positioning accuracy of less than one angular minute and a repeat accuracy of only a few angular seconds. Additionally, strain wave gear mechanisms are substantially more compact and lighter than conventional gear mechanisms, such that they are particularly suited for use in robotics, prosthetic, and similar technical fields in which high-precision pivoting movements must be realized in very small mechanical spaces. In order to realize a pivoting movement between two components of the gear mechanism, it is either connected to a pivot bearing or is itself a part of the pivot bearing.

Because the transmission of force occurs over a large tooth engagement region, strain wave gear mechanisms can generally transmit higher torques than conventional gear mechanisms of a similar size. In the simplest case with only three essential components, namely the flex spline, the circular spline, and the wave generator, reductions of 30:1 to 320:1 are achieved in one step. In rated operation, efficiencies of up to 85% are achieved. Strain wave gear mechanisms are generally not self-inhibiting and normally show no or practically no stick-slip behavior. In order to achieve these particular advantages, such gear mechanisms are often equipped with a lubricant mass which is provided partially as a permanent lubrication, which serves in particular to lubricate the toothing system as well as the drive component.

For this purpose, the lubricant is applied on the side of the flexible transmission component opposite the toothing system. Supported by the "walking movement" performed during the operation of the transmission component, the lubricant reaches the desired lubrication sites in on toothing system and the drive component. Due to the walking movement that similarly appears on the toothing system, the "used" lubricant exits the region of the toothing system and settles within the gear mechanism.

In certain applications, it can occur that the used lubricant wanders within the gear mechanism, for example reaching up to the pivot bearing of the gear mechanism and moving through the bearing intermediate space given there. If needed, the bearing intermediate space can be sealed against the entry of undesired materials or the exit of roller bearing grease by way of an outer radial shaft sealing ring. However, such a sealing ring frequently does not withstand an application with a large mass of lubricant, such that there can be an undesired lubricant leak. Such a lubricant leak can result in hardly any backlog of used lubricant accruing within the gear mechanism opposite the toothing system, whereby the lubricant mass subsequently conveyed due to the walking movement increases and the gear mechanism can run dry prematurely.

Proceeding from the disadvantages described above, the invention is based upon the task of providing an improved strain wave gear mechanism in which the risk of a lubricant leak and/or the risk of a premature dry running can be reliably reduced.

SUMMARY OF THE INVENTION

In a first embodiment of the invention, a strain wave gear mechanism is provided with a gear mechanism component and an elastically deformable transmission component which is at least partially in alignment therewith in the radial direction. The transmission component can be deformed elliptically by way of a drive component which interacts therewith in such a way that internal or external toothing systems, which are provided on the gear mechanism component and the transmission component, can be brought into engagement in opposite regions of an elliptical axis in order to rotate the transmission component and the gear mechanism component relative to one another. The transmission component and the gear mechanism component are mounted such that they can be rotated relative to one another by means of a pivot bearing which has a bearing intermediate space. The invention is characterized in that an interior space of the strain wave gear mechanism, in which interior space is enclosed at least partially by the transmission component and the internal or external toothing system and adjoins the pivot bearing, is sealed by means of an inner seal with respect to the bearing intermediate space of the pivot bearing.

This has the advantage that any material that is located in the gear mechanism interior space and possibly disadvantageous for the pivot bearing is collected in the interior space and an entry of this material into the pivot bearing or a movement through the pivot bearing is prevented or at least strongly diminished. For example, grease, tooth grit, shavings, or other foreign bodies that collect in the interior space of the gear mechanism can be prevented from entering the pivot bearing. Further, a resulting possible leak through the pivot bearing is prevented or at least strongly diminished. It can also be provided that the inner seal is even permeable to lubricant to a certain degree, so that lubricant can exit the interior space of the strain wave gear mechanism in a controlled manner and be used for the lubrication of the pivot bearing. The sealing can also occur such that virtually no gear mechanism lubricant enters the pivot bearing. This is advantageous, in particular, if the pivot bearing is formed to be dry running, in contrast to the gear mechanism toothing system, for example as a dry-lubricated slide or roller bearing or even as a magnet bearing. A sealing against the entry of lubricant through the pivot bearing can also be particularly advantageous if the gear mechanism lubricant and a bearing lubricant used in the pivot bearing are chemically or otherwise incompatible.

In one embodiment of the invention, it can be provided that the inner seal is formed as a dynamic seal, preferably as a shaft sealing ring, in particular as an axial shaft sealing ring or radial shaft sealing ring or gasket. It has been found that these alternatives are particularly durable and low in wear. Axial shaft sealing rings and gaskets are also particularly suited, because the necessary mechanical space is small with a simultaneously good sealing effect.

Preferably, it can be provided that the inner seal essentially consists of an elastomer or a lubricant-soaked felt material. The use of an elastomer allows the cost-effective manufacturing of the inner seal as well as the ability to resist chemicals used in the gear mechanism, such as lubricants. By contrast, an inner seal made of lubricant-soaked felt material allows the expansion of the production tolerances necessary in the sealing region because the felt material has a flexibility that can compensate for any inaccuracies that may appear.

In a further development of the invention, it can also be provided that the inner seal is also formed in sections as a static seal and is inserted between two parts of the strain wave gear mechanism which are connected in a rotation-proof manner. In this way, the inner seal can simultaneously fulfill multiple sealing functions, whereby the assembly expense and simultaneously the size can be reduced. In particular, it can be provided here that the inner seal is formed with at least one O-ring, such that the inner seal is held in the desired installation position within the gear mechanism through the fixing of the O-ring.

Advantageously, it can be provided that the inner seal is arranged between the transmission component and a bearing ring of the pivot bearing and preferably adjoins the bearing ring in a sealing fashion, in particular with at least one sealing lug and/or one sealing lip and/or one sealing surface. The sealing can be hereby be integrated into the strain wave gear mechanism during the assembly at a low cost.

Preferably, the inner seal can adjoin a sealing surface of the strain wave gear mechanism under prestraining, preferably under spring-loaded prestraining, in particular under self-prestraining. In this way, the reliability of the sealing effect can be even further increased and adjusted precisely.

The inner seal can also have an overlap in one region with respect to a sealing surface of the strain wave gear mechanism. An overlap similar to a press fit enables a particularly good and reliable sealing effect because the interaction between the sealing surface and the inner seal can be adjusted precisely.

Further, the inner seal can have a base body which is fixed in the installed state within the strain wave gear mechanism, wherein a sealing lip projecting from the base body adjoins the sealing surface under buildup of a self-prestraining produced essentially through bending. This has the advantage that the inner seal itself produces the prestraining necessary for the sealing effect as a self-straining. Through corresponding formation of the inner seal, in particular of the sealing lip, the overlap and the resulting prestraining can be adjusted precisely.

The bending of the sealing lip producing the self-prestraining can correspond to an overlap of about 0 mm to 1.5 mm. This value range has been found to be particularly advantageous.

Alternatively, it can be provided that the inner seal is excessively inserted between the sealing surface and a further component of the strain wave gear mechanism in the region of at least one sealing lug, such that the at least one sealing lug contacts the sealing surface under prestraining. Here, it is particularly advantageous that the prestraining of the sealing surface can be adjusted precisely due to the excess of the inner seal. This solution is particularly suited for small mechanical spaces and is largely insensitive to a creeping of the sealing material due to the sealing edges that are primarily pressure-strained.

It has been found to be particularly advantageous when the excessive inner seal in the region of at least one sealing lug is adjusted so that it corresponds to an overlap of about 0 to about 0.4 mm, preferably an overlap of about 80 µm to about 240 µm. This value range has been found to be particularly advantageous with respect to the sealing effect and the creeping behavior in the sealing material.

Alternatively, the inner seal can be formed as a gasket which lies opposite to a sealing section of the sealing surface. This variant of the invention functions according to the sealing concept of a "gap seal." A prestraining of the inner seal in the direction of the sealing surface is not necessary because the sealing effect is based upon an extension of the theoretical flow path through the gap to be sealed. The flow resistance counteracting a passage, for example of the lubricant, is thereby substantially increased. This variant is particularly suited for very small mechanical spaces. The sealing section preferably lies opposite the sealing surface at a distance of about 0 mm to about 0.2 mm.

An embodiment of the strain wave gear mechanism has been found to be advantageous in which the inner seal is held within the strain wave gear mechanism in a self-supporting manner, in particular via friction. The inner seal exerts a self-prestraining on its support within the strain wave gear mechanism such that a separately provided pre-straining can be foregone, which would otherwise need to be affected by additional parts of the strain wave gear mechanism.

The strain wave gear mechanism can also be formed advantageously such that the interior space forms a reservoir for the intake of materials entering the interior space, in particular lubricants. Any material moving through the toothing system in the interior space of the strain wave gear mechanism can be collected in the interior space. Provided the interior space has sufficiently large dimensions, for example through the provision of cutouts, chamfers, recesses, or bags, a large mass of accruing material, primarily lubricant, can be taken in without an unnecessary application on the inner seal and thus an impairment of the sealing effect. In this way, a sealing effect over the lifetime of the strain wave gear mechanism can be even more reliably enabled.

It can also be provided that a lubricant mass for the lubrication of the internal and external toothing systems and/or the pivot bearing and/or a wave generator bearing is provided in and/or on the strain wave gear mechanism, wherein the volume of the lubricant mass is less than or equal to, or at the most 1.1 times larger than, the volume of the interior space.

In this way, the interior space can serve as a reservoir for used or unused lubricant and an excessive application of lubricant on the inner seal can reliably be avoided or at least significantly reduced.

In order to avoid or reduce a worsening of the efficiency of the strain wave gear mechanism due to the forces of friction arising on the inner seal, it can be provided that the inner seal and/or a sealing surface interacting with the inner seal is at least regionally treated in a friction-reducing manner. The drag torque caused by the inner seal can at least be significantly diminished through the use of a surface treatment. For example, a coating, or even a friction-reducing bonded coating, can be provided on the inner seal and/or the corresponding sealing surface. It is also possible to use friction-optimized agents for the inner seal as a complete component, e.g. polytetrafluoroethylene (PTFE), as a sealing material. Alternatively, a friction-optimized material can also be partially applied, for example only in the sealing lip or sealing edge region, such that the inner seal is formed as a two-component seal. Here for example, it is conceivable to provide additional polytetrafluoroethylene (PTFE) only in the sealing lip region. Alternatively, the surface of the metallic gear mechanism component can be treated in a friction-reducing manner. For example, the surface can be gas-nitrified, ion-implanted, or silver-titanium-nitrified in order to minimize the friction that arises from the interaction with the seal. For the ion implantation, nitrogen or argon can be used as the ion gas, for example.

Friction-changing surface treatments of the inner seal and/or the sealing surface have a positive effect, in particular, on the shift between static friction and kinetic friction, the so-called stick-slip effect, which is especially advantageous for applications in robotics.

According to a variant of the invention, the inner seal can have at least one, preferably two, O-rings and/or sealing lugs and/or sealing lips acting as a double seal. The reliability and also the lifetime of the sealing can hereby be increased. The sealing effect can also be significantly increased if the inner seal is arranged with its sealing lips between two components that can be moved relative to one another through the repeated elastic deformation of the transmission component.

PRESENTATION OF THE INVENTION

Further goals, advantages, features, and possible applications of the present invention are found in the following description of an exemplary embodiment using the illustration. All described and/or illustrated features form the object of the present invention, either in and of themselves or in any reasonable combination with one another, independently of their summary in the claims or the references made to them.

DESCRIPTION OF THE DRAWINGS

The following are shown partially schematically.

In the figures illustrated below, identical or similarly functioning components bear reference numerals in order to improve readability.

DETAILED DESCRIPTION

Figure 1:
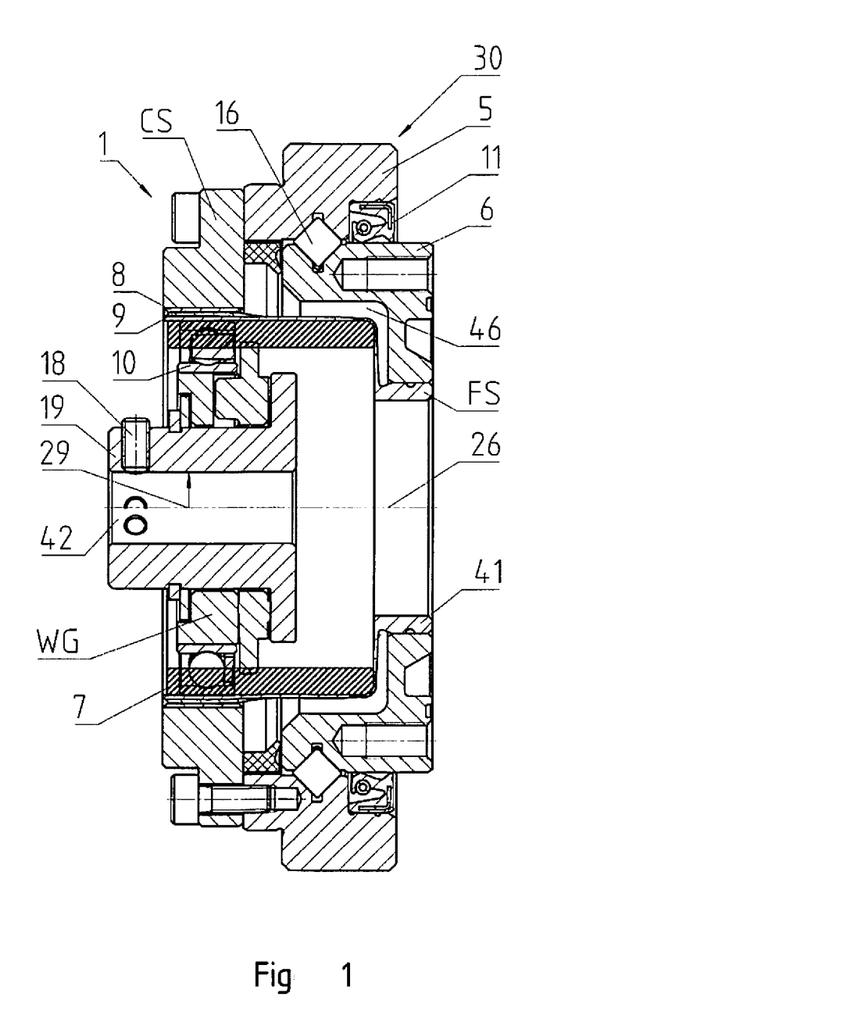
FIG. 1 a section view of a strain wave gear mechanism according to a first embodiment, FIG. 2 an enlarged excerpt of the strain wave gear mechanism according to FIG. 1, FIG. 3 a section view of a strain wave gear mechanism according to a second embodiment, FIG. 4 an enlarged excerpt of the strain wave gear mechanism according to FIG. 3, FIG. 5 a lateral section view of a strain wave gear mechanism according to a third embodiment, FIG. 6 an enlarged excerpt of the strain wave gear mechanism according to FIG. 5, FIG. 7 an excerpt enlargement of the strain wave gear mechanism according to FIG. 1 in the region of the inner seal, FIG. 8 an excerpt enlargement of the strain wave gear mechanism according to FIG. 3 in the region of the inner seal, FIG. 9 an excerpt enlargement of the strain wave gear mechanism according to FIG. 5 in the region of the inner seal.

FIG. 1 shows a first exemplary embodiment of a strain wave gear mechanism 1 with a gear mechanism component CS formed as an inner gearwheel which engages in overlap and regionally interferes with the external toothing system 9 of a transmission component FS in the region of its internal toothing system 8. The transmission component FS is connected in a torque-proof manner with an interior bearing ring 6 of a pivot bearing 30 which mounts the transmission component FS and the gear mechanism component CS rotatably about one another. The exterior bearing ring 5 of the pivot bearing 30 is connected to the gear mechanism component CS in a torque-proof manner. Similarly torque-proof with the transmission component FS, a plug 41 is provided that forms the end of the strain wave gear mechanism 1 at the output side of the strain wave gear mechanism 1 shown on the right in FIG. 1.

Along a gear axis 26, about which the components of the strain wave gear mechanism 1 rotate during operation, a gear mechanism input shaft 19 upon which the drive component WG is laced lies opposite to the plug 41. In order to connect an external input shaft (not shown), the gear mechanism input shaft 19 has one or more grub screws 18 with which a stub shaft can be fixed within a through-hole 42 of the gear mechanism input shaft 19.

The drive component WG placed on the gear mechanism input shaft 19 has an elliptical form pointing towards the gear axis 26 and fits into a correspondingly formed bearing 10 of the wave generator. The wave generator bearing 10 adjoins the transmission component FS at its interior such that the transmission component FS assumes the elliptical form and engages with the internal toothing system 8 of the gear mechanism component CS in the region of the large elliptical axis.

When operating the gear mechanism input shaft 19 around the gear axis 26, the transmission component FS is deformed cyclically by the drive component WG, such that there is a relative movement between the transmission component FS and the gear mechanism component CS through the shifting tooth engagement.

Due to the number of teeth, which deviates by two, the internal toothing systems 8 of the gear mechanism component CS and the external toothing system 9 of the transmission component FS, which are essentially aligned in the radial direction 29, cause a high reduction between the movement at the gear mechanism input shaft 19 and the rotational movement of the internal bearing ring 6 of the pivot bearing 30 that serves as an output. The gear mechanism component CS and the exterior bearing ring 5 are fixed in a torque-proof manner with respect to the input and output side of the gear mechanism. In this case, the rotational movement at the gear mechanism output side is opposite to the rotational movement at the input side.

Figure 2:
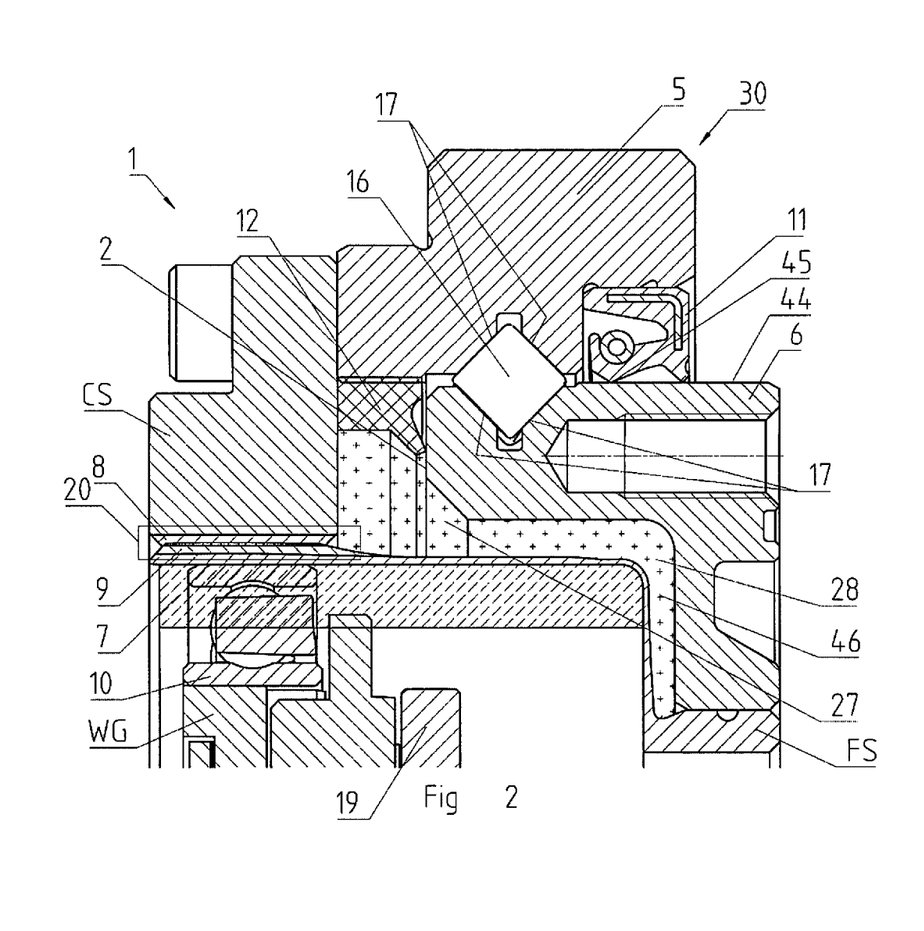

An excerpt of the strain wave gear mechanism 1 shown in FIG. 1 is enlarged in FIG. 2. Here, it can be seen that the pivot bearing 30 has bearing tracks 17 on its exterior bearing ring 5 and its interior bearing ring 6 for roller elements which are taken up in a bearing intermediate space 16 between the bearing rings 5, 6. Instead of a roller bearing, the pivot bearing 30 can also be formed as a slide bearing or magnet bearing. In the formation as a slide bearing or as a roller bearing, a bearing lubricant is used which is used for the reduction of friction during the movement of the roller bearing element and the bearing surfaces respectively.

In order to be able to prevent an exit of bearing lubricant to the exterior, an outer seal 11 can seal the bearing intermediate space 16 between the exterior bearing ring 5 and the interior bearing ring 6, as shown here. In the present case, the outer seal 11 is formed as a radial shaft sealing ring which is externally supported radially on a recess 43 within the bearing ring 5 and on the opposite side adjoins, with a sealing edge 45, a lateral surface of the interior bearing ring 6 formed as a sealing surface 44.

On the opposite side of the bearing intermediate space 16, the end face of the interior bearing ring 6 is formed as a sealing surface 2, with respect to which an inner seal 12 arranged in the interior space 28 of the strain wave gear mechanism 1 provides sealing. The remaining part of the interior space 28 that is sealed with respect to the bearing intermediate space 16 by the inner seal 12 forms a reservoir 46 for material that can enter the interior space 28 through the toothing region 20 in particular. The reservoir 46 is designated in FIGS. 2, 4, and 6 by cross-hatching in the form of small crosses in the interior space 28.

Figure 7:
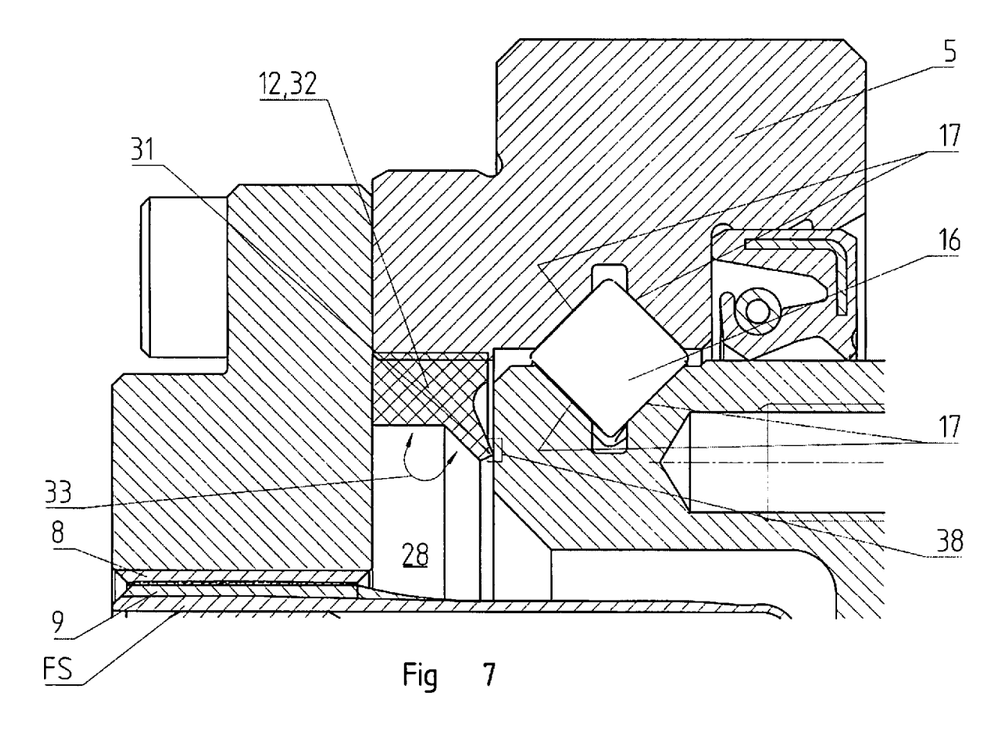

As shown in further detail in FIG. 7, this inner seal 12 has a base body 32 which projects from a sealing lip 31. In the installed state, the sealing lip 31 is bent away from the sealing surface 2 in a bending direction 33 in order to build up a prestraining aimed at the sealing surface 2 in the form of a self-prestraining. The sealing lip 31 then lies upon the sealing surface 2 in an overlap region 38 and thus seals the interior space 28 with respect to the bearing intermediate space 16.

On the radially internal side of the transmission component FS, a lubricant mass 7 is applied which is transported as a gear mechanism lubricant upon movement of the transmission component FS and in this way lubricates the tooth engagement at the internal toothing system 8 and the external toothing system 9. Through the continued tooth engagement, the lubricant is conveyed into the interior space 28 of the strain wave gear mechanism 1 and settles there. In the process, the lubricant picks up grit from the tooth flanks and, in the case of error, any shavings that appear but are not meant to enter the bearing intermediate space 16 or move through it.

The inner seal 12 prevents the passage of the used lubricant entering the interior space 28. In order to avoid or reduce an application of the inner seal 12 with too much used lubricant, an additional chamber 27 in the form of a chamfer is provided on the interior bearing ring 6, through which the volume of the interior space 28 can be increased and adjusted to the lubricant mass 7.

Figure 3:
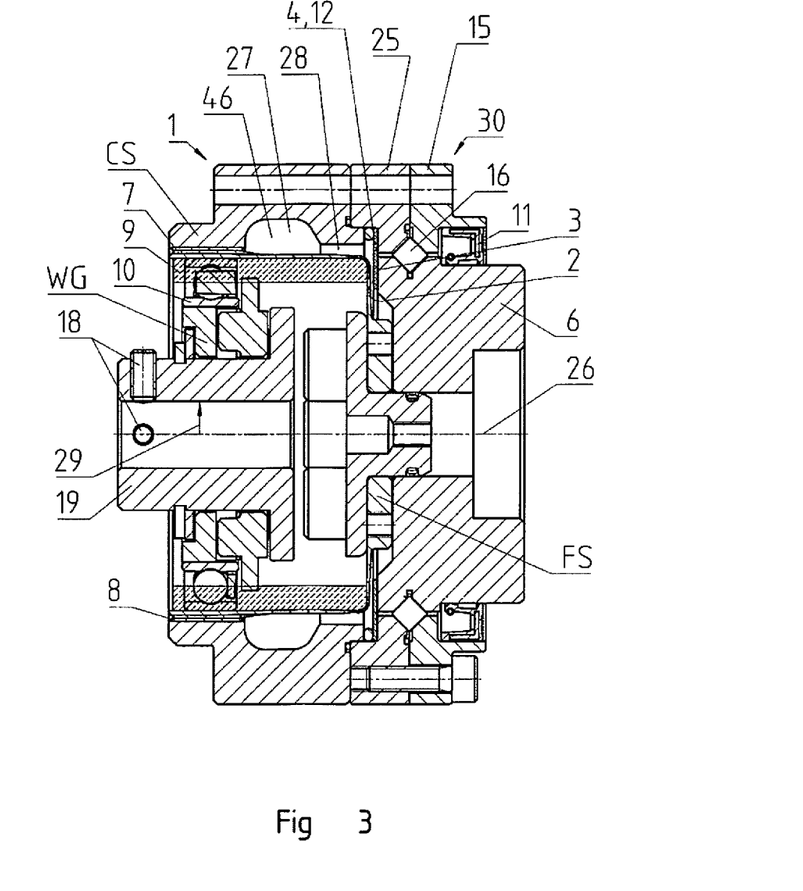
Figure 4:
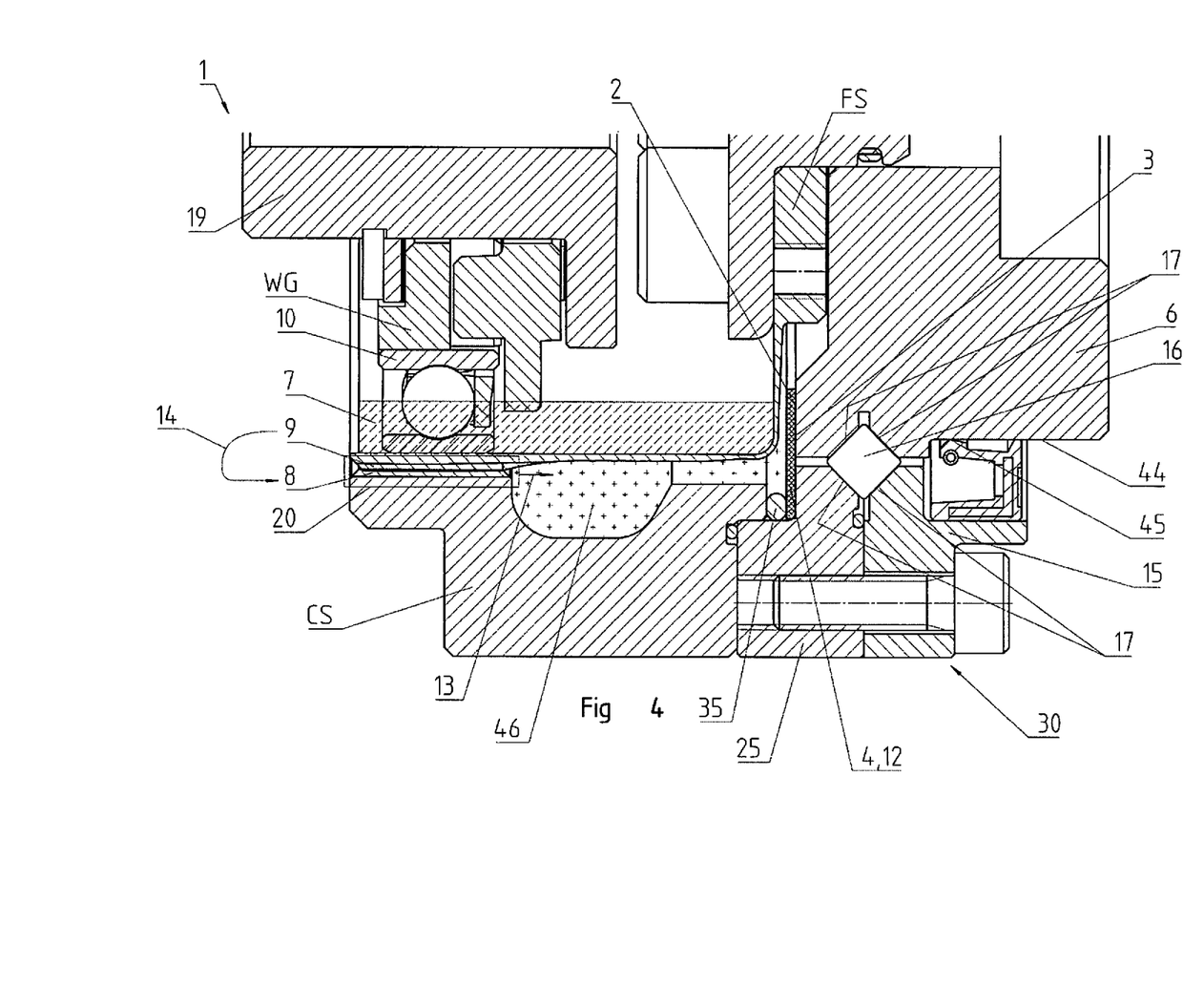
Figure 8:
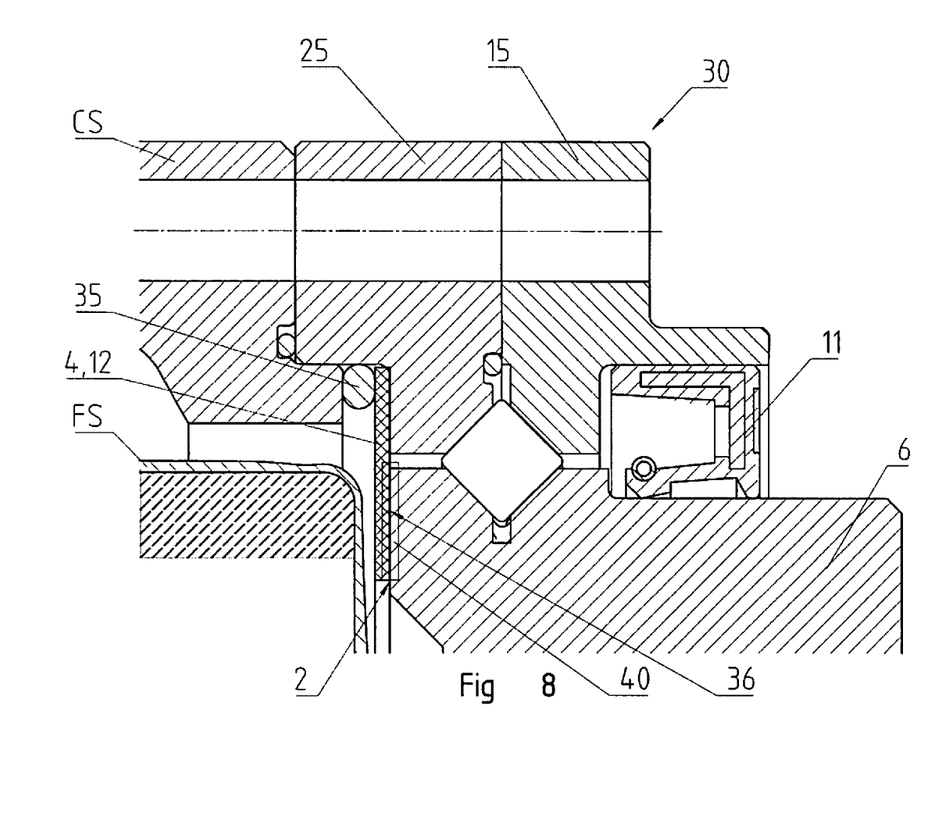

FIGS. 3, 4, and 8 show a second exemplary embodiment of the invention which essentially differs from the first exemplary embodiment in that the inner seal 12 is formed as a gasket 4 which seals the interior space 28 with respect to the bearing intermediate space 16. In the present case, the gasket functions according to the principle of a gap sealing, wherein an annular clearance of about 0 to 0.2 mm is given in the region of a sealing section 3 of the gasket 4. The clearance is formed between the sealing section 40 on the interior bearing ring 6 and the sealing section 3 on the gasket 4. The gasket is held between the pivot bearing 30 and the gear mechanism component CS by an additional O-ring 35 and simultaneously statically seals the gap that exists between the gear mechanism component CS and the pivot bearing.

In the present case, the exterior bearing ring is formed in two parts with the bearing ring halves 15 and 25. As in the first exemplary embodiment, the bearing ring half 15 is equipped with an outer seal 11 which seals the exterior bearing ring half 15 with respect to the interior bearing ring 6.

Figure 5:
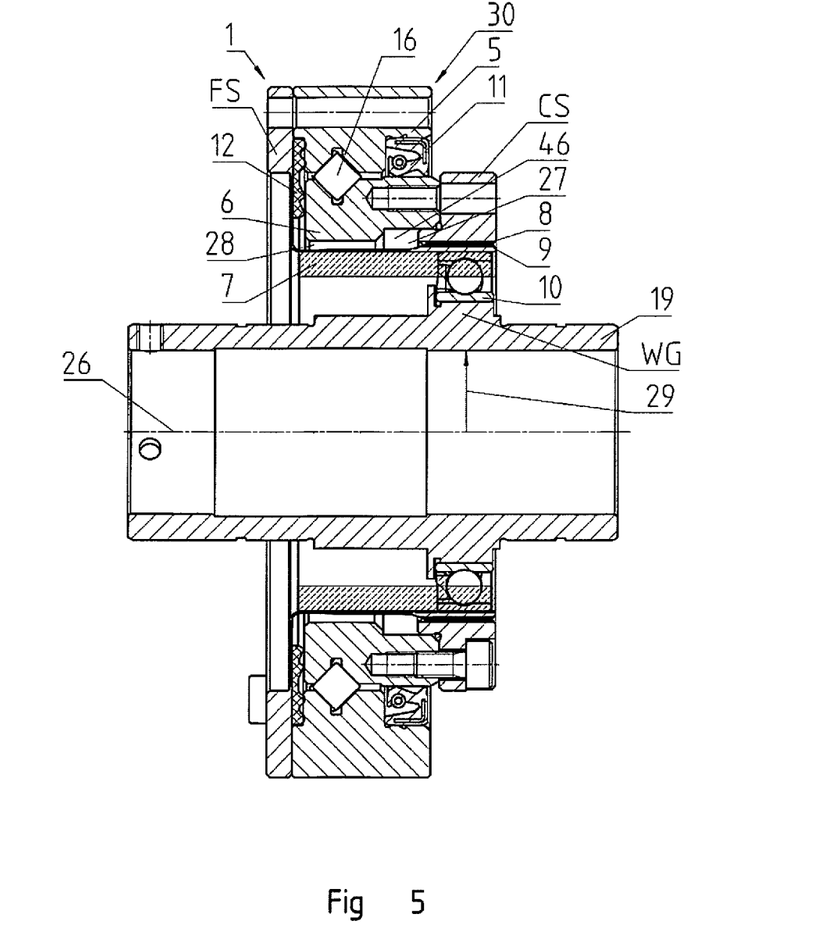
Figure 6:
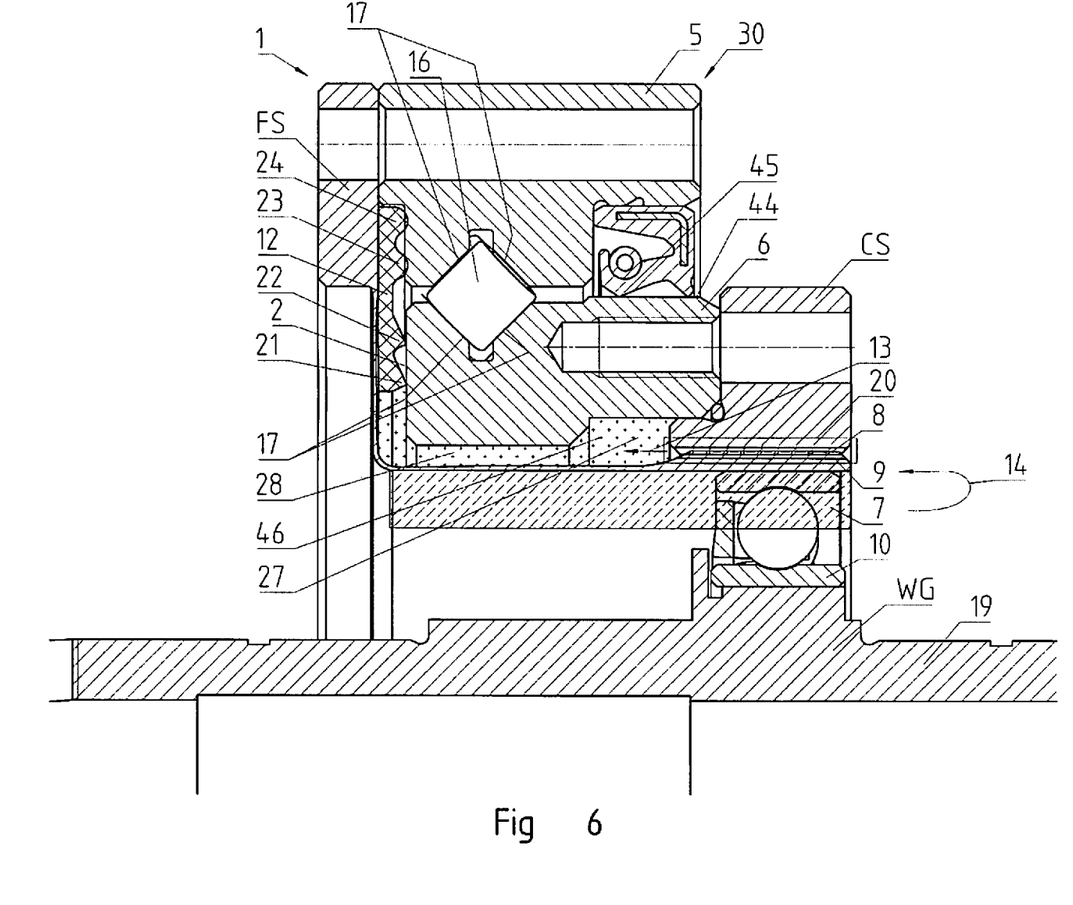
Figure 9:
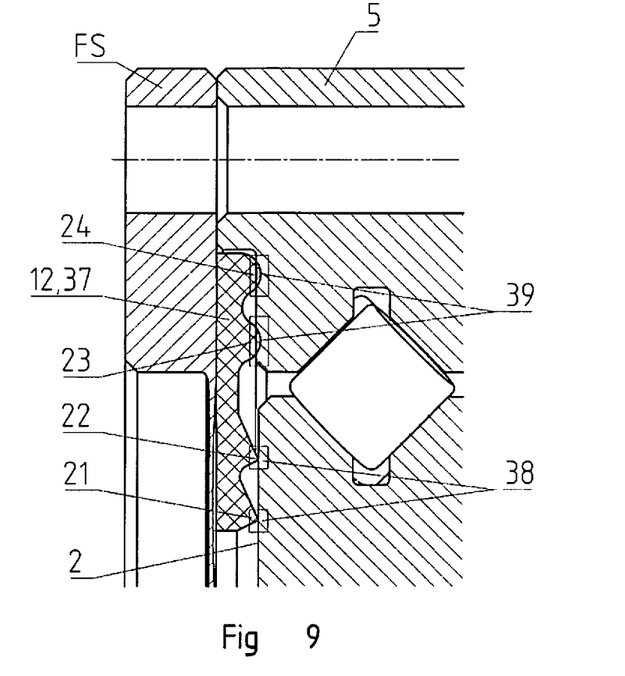

FIGS. 5, 6, and 9 show a third exemplary embodiment of the present invention.

The third exemplary embodiment essentially differs from the first two exemplary embodiments in that the inner seal 12 is inserted and held between the transmission component FS and the exterior bearing ring 5 in the region of two adjoining sections formed as O-ring 23 and O-ring 24. The inner seal 12 has a section connected to the O-rings 23, 24, which has two sealing lugs 21, 22, which adjoin the sealing surface 2 of the interior bearing ring 6 in overlap regions 38. The O-rings 23, 24 are similarly in contact with the pivot bearing 30 in an overlap region 39, here with the exterior bearing ring 5. In order to form the overlap, the O-rings 23, 24 and sealing edges 21, 22, respectively, are squeezed in the direction of the gear axis 26, i.e. excessively inserted into the gap between the transmission component FS and the bearing rings 5, 6. The section of the structured gasket 37 having the sealing edges 21, 22 is limply connected to the section having the O-rings 23, 24. The prestraining necessary for the squeezing of the sealing edges 21 and 22 is built up by the transmission component FS in the direction of the gear axis 26.

However, it is also conceivable for the structured gasket 37 to be formed rigidly and for the prestraining for the adjoining of the sealing edges 21, 22 to the sealing surface 2 to be built up as a self-prestraining of the gasket 37. A combination of self-prestraining and support by the transmission component is also conceivable.

FIG. 6 shows the movement of the lubricant through the gear mechanism in further detail. This movement can be transferred to all exemplary embodiments. Here, the lubricant moves from the lubricant mass 7 in the flow direction 14 around the end face of the transmission component FS and through the toothing region 20 between the external toothing system 9 and the internal toothing system 8. The transportation of the lubricant from the interior of the transmission component FS to its exterior is also favored by the fact that a housing section (not shown) is provided on the front end of the transmission component FS and the gear mechanism component CS. It redirects the lubricant flow in the flow direction 14. The lubricant then passes through the toothing region 20 in the flow direction 13 and into the interior space 28 of the strain wave gear mechanism 1 and remains there for the rest of the lifetime of the strain wave gear mechanism or until the next maintenance event.

In the second and third exemplary embodiments as well, additional chambers 27 are provided which enlarge the volume of the interior space 28 for the intake of lubricant. In the second exemplary embodiment, the chamber 27 has a bag form. In the third exemplary embodiment, the chamber 27 is formed as a recess in the radial direction 29.

The three embodiments described here relate to a strain wave gear mechanism in the customary manner of construction. However, the present invention can be used in strain wave gear mechanisms in a flat construction or in external rotor gear mechanisms with the advantages described above.

LIST OF REFERENCE NUMERALS

1 Strain wave gear mechanism
2 Sealing surface
3 Sealing section
4 Gasket
5 Bearing ring (exterior)
6 Bearing ring (interior)
7 Lubricant mass
8 Internal toothing system
9 External toothing system
10 Wave generator bearing
11 Outer seal
12 Inner seal
13 Flow direction
14 Flow direction
15 Bearing ring half
16 Bearing intermediate space
17 Bearing track
18 Grub screw
19 Gear mechanism input shaft
20 Toothing region
21 Sealing lug
22 Sealing lug
23 O-ring
24 O-ring
25 Bearing ring half
26 Gear axis
27 Chamber
28 Interior space
29 Radial direction
30 Pivot bearing
31 Sealing lip
32 Base body
33 Bending direction
34 Gasket
35 O-ring
36 Sealing surface
37 Structured gasket (limp)
38 Overlap region
39 Overlap region
40 Sealing section
41 Plug
42 Through-hole
43 Recess
44 Sealing surface
45 Sealing edge
46 Reservoir
CS Gear mechanism component (Circular Spline)
FS Transmission component (Flex Spline)
WG Drive component (Wave Generator)

The invention claimed is:

1. A strain wave gear mechanism (1), comprising:
   a gear mechanism component (CS) having an internal or external toothing system (8);
   an elastically deformable transmission component (FS) having an internal or external toothing system (9) that engages with the internal or external toothing system (8);
   a drive component (WG);
   wherein the elastically deformable transmission component (FS) is at least partially in alignment with the gear mechanism component (CS) in the radial direction (29) and is configured to be deformed elliptically by way of the drive component (WG) which interacts with the elastically deformable transmission component (FS) in such a way that the internal or external toothing systems (8, 9) are brought into engagement in opposite regions of an elliptical axis in order to rotate the transmission component (FS) and the gear mechanism component (CS) relative to one another;
   a pivot bearing (30) by which the transmission component (FS) and the gear mechanism component (CS) can be rotated relative to one another, said pivot bearing (30) having a bearing intermediate space (16); and
   an interior space (28) of the strain wave gear mechanism (1), which interior space (28) is enclosed at least partially by the transmission component (FS) and the internal or external toothing systems (8, 9) and adjoins the pivot bearing (30), that is sealed with an inner seal (12) consisting essentially of an elastomer configured to form a dynamic seal with respect to the bearing intermediate space (16) of the pivot bearing (30), and wherein the inner seal (12) is a gasket (34, 37) having one or more static seal sections insertable between two parts of the strain wave gear mechanism (1) which are connected in a rotation-proof manner.

2. The strain wave gear mechanism (1) according to claim 1 wherein the inner seal (12) is a shaft sealing ring.

3. The strain wave gear mechanism (1) according to claim 1, wherein the inner seal (12) is arranged between the transmission component (FS) and a bearing ring (5, 6) of the pivot bearing (30) and adjoins the bearing ring (5, 6) in a sealing fashion with at least one sealing lug (21, 22) and/or one sealing lip (31) and/or one sealing surface (36).

4. The strain wave gear mechanism (1) according to claim 1 wherein the inner seal (12) adjoins a sealing surface (2) of the strain wave gear mechanism (1) under prestraining.

5. The strain wave gear mechanism (1) according to claim 1, wherein the inner seal (12) has an overlap in one region (38) with respect to a sealing surface (2) of the strain wave gear mechanism (1).

6. The strain wave gear mechanism (1) according to claim 4 wherein the inner seal (12) has a base body (32) which is fixed in the installed state within the strain wave gear mechanism (1) and wherein a sealing lip (31) projecting from the base body (32) adjoins the sealing surface (2) under buildup of a self-prestraining produced essentially through bending.

7. The strain wave gear mechanism (1) according to claim 6 wherein the bending of the sealing lip (31) producing the self-prestraining corresponds to an overlap of 0 mm to 1.5 mm.

8. The strain wave gear mechanism (1) according to claim 4 wherein the inner seal (12) is inserted between the sealing surface (2) and a further component of the strain wave gear mechanism (1) in the region of at least one sealing lug (21, 22) such that the at least one sealing lug (21, 22) contacts the sealing surface (2) under prestraining.

9. The strain wave gear mechanism (1) according to claim 8 wherein the inner seal (12) in the region of at least one sealing lug (21, 22) corresponds to an overlap of 0 to 0.4 mm.

10. The strain wave gear mechanism (1) according to claim 4 wherein the inner seal (12) formed as the gasket (34) lies opposite to a sealing section (40) of the sealing surface (2).

11. The strain wave gear mechanism (1) according to claim 1, wherein the inner seal (12) is held within the strain wave gear mechanism (1) in a self-supporting manner via friction.

12. The strain wave gear mechanism (1) according to claim 1, wherein the interior space (28) forms a reservoir (46) for the intake of lubricants entering the interior space (28).

13. The strain wave gear mechanism (1) according to claim 1, further comprising a lubricant mass (7) for the lubrication of one or more of the internal and external toothing systems (8, 9) and/or the pivot bearing (30) and/or a wave generator bearing (10), wherein the lubricant mass is provided in and/or on the strain wave gear mechanism (1), and wherein the volume of the lubricant mass (7) is less than or equal to, or at the most 1.1 times larger than, the volume of the interior space (28).

14. The strain wave gear mechanism (1) according to claim 1 wherein the inner seal (12) and/or a sealing surface (2) interacting with the inner seal (12) is at least partially coated with a friction-reducing coating.

15. The strain wave gear mechanism (1) according to claim 1, wherein the inner seal (12) has at least one O-ring (23, 24) and/or sealing lug (21, 22) and/or sealing lip (31) acting as a double seal.

16. A strain wave gear mechanism, comprising:
a gear mechanism component (CS) having a first internal or external toothing system;
an elastically deformable transmission component (FS) having a second internal or external toothing system that engages with the first internal or external toothing system;
a drive component (WG);
wherein the elastically deformable transmission component (FS) is at least partially in alignment with the gear mechanism component (CS) in the radial direction and is configured to be deformed elliptically by way of the drive component (WG) which interacts with the elastically deformable transmission component (FS) in such a way that the first and second internal or external toothing systems are brought into engagement in opposite regions of an elliptical axis in order to rotate the transmission component (FS) and the gear mechanism component (CS) relative to one another;
a pivot bearing by which the transmission component (FS) and the gear mechanism component (CS) can be rotated relative to one another, said pivot bearing having a bearing intermediate space; and
a gasket consisting essentially of an elastomer, said gasket formed as a dynamic seal with respect to the bearing intermediate space of the pivot bearing, wherein said gasket seals an interior space of the strain wave gear mechanism, which interior space is enclosed at least partially by the transmission component (FS) and the first and second internal or external toothing systems and adjoins the pivot bearing, and wherein said gasket has one or more static seal sections insertable between two parts of the strain wave gear mechanism which are connected in a rotation-proof manner.

* * * * *